(12) United States Patent
Guey et al.

(10) Patent No.: US 10,389,558 B2
(45) Date of Patent: Aug. 20, 2019

(54) METHOD AND APPARATUS FOR SYNCHRONIZATION

(71) Applicant: MEDIATEK INC., Hsinchu (TW)

(72) Inventors: Jiann-Ching Guey, Hsinchu (TW); Chun-Hsuan Kuo, San Diego, CA (US); Chao-Cheng Su, Kaohsiung (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/616,277

(22) Filed: Jun. 7, 2017

(65) Prior Publication Data

US 2018/0097677 A1 Apr. 5, 2018

Related U.S. Application Data

(60) Provisional application No. 62/403,220, filed on Oct. 3, 2016.

(51) Int. Cl.
| | |
|---|---|
| *H04L 5/00* | (2006.01) |
| *H04L 12/26* | (2006.01) |
| *H04L 25/49* | (2006.01) |
| *H04L 27/18* | (2006.01) |
| *H04L 27/26* | (2006.01) |

(52) U.S. Cl.
CPC ............. *H04L 27/18* (2013.01); *H04L 5/005* (2013.01); *H04L 25/4902* (2013.01); *H04L 27/261* (2013.01); *H04L 27/2615* (2013.01); *H04L 43/16* (2013.01)

(58) Field of Classification Search
CPC ...... G01S 7/2806; G06F 11/348; G11C 19/00
See application file for complete search history.

(56) References Cited

U.S. PATENT DOCUMENTS

| | | | | |
|---|---|---|---|---|
| 2,970,302 A | * | 1/1961 | Gridley | ................... G05D 3/20 318/608 |
| 3,462,551 A | * | 8/1969 | Fong | ........................ H03L 7/14 370/350 |

(Continued)

FOREIGN PATENT DOCUMENTS

| | | | | |
|---|---|---|---|---|
| EP | 1496371 A1 | * | 1/2005 | ............. G01S 7/282 |
| EP | 1496371 A1 | * | 1/2005 | ............. G01S 7/282 |

(Continued)

OTHER PUBLICATIONS

Combined Taiwanese Office Action and Search Report dated Jun. 8, 2018 in Patent Application No. 106131737 (with English language translation of categories of cited documents).

*Primary Examiner* — Berhanu Tadese
(74) *Attorney, Agent, or Firm* — Oblon, McClelland, Maier & Neustadt, L.L.P.

(57) ABSTRACT

Aspects of the disclosure provide an apparatus that includes a baseband processing circuit and a transmitting circuit. The baseband processing circuit is configured to encode a reference signal based on a specific sequence to generate a digital stream. The specific sequence has non-zero values at selected positions, and the number of coincidences of non-zero value positions between the specific sequence and a shifted copy of the specific sequence is smaller than a threshold. The transmitting circuit is configured to transmit wireless signals in response to the digital stream.

24 Claims, 4 Drawing Sheets

(56) References Cited

U.S. PATENT DOCUMENTS

| | | | | |
|---|---|---|---|---|
| 3,971,920 A * | 7/1976 | Johnson | | G01S 7/2806 377/67 |
| 4,158,505 A * | 6/1979 | Mathisen | | G01J 3/02 356/308 |
| 4,669,089 A * | 5/1987 | Gahagan | | H04B 1/707 375/146 |
| 5,469,305 A * | 11/1995 | Madsen | | G11B 5/09 360/51 |
| 5,796,765 A * | 8/1998 | Lucek | | G02F 1/3517 372/18 |
| 6,970,465 B2 * | 11/2005 | Karr | | H04H 20/18 370/394 |
| 7,194,019 B2 * | 3/2007 | Dowla | | H04B 1/71637 375/139 |
| 7,209,521 B2 * | 4/2007 | Szajnowski | | H03K 3/64 375/259 |
| 7,376,074 B2 * | 5/2008 | Jung | | H04L 27/2621 370/208 |
| 7,400,666 B2 * | 7/2008 | Brethour | | H04B 1/7163 375/130 |
| 7,408,499 B2 * | 8/2008 | Szajnowski | | G01S 7/282 340/435 |
| 7,554,986 B2 * | 6/2009 | Karr | | H04H 20/18 370/394 |
| 7,675,960 B2 * | 3/2010 | Brethour | | H04B 1/7163 375/130 |
| 7,711,029 B2 * | 5/2010 | Guey | | H04B 1/7143 370/206 |
| 7,839,247 B2 * | 11/2010 | Fullerton | | H01F 7/0284 24/303 |
| 8,369,435 B2 * | 2/2013 | Fimoff | | H04L 25/022 375/259 |
| 8,744,275 B2 * | 6/2014 | Liu | | H04B 10/2507 398/183 |
| 9,398,617 B2 * | 7/2016 | Guo | | H04W 74/0833 |
| 9,531,431 B2 * | 12/2016 | Woodsum | | H04B 1/7095 |
| 9,628,311 B2 * | 4/2017 | Bertrand | | H04J 13/0062 |
| 9,641,274 B2 * | 5/2017 | Kerhuel | | H04L 5/00 |
| 9,921,321 B2 * | 3/2018 | Kuvshinov | | G01V 1/005 |
| 2003/0110027 A1 * | 6/2003 | Mittal | | G06T 9/005 704/219 |
| 2003/0202460 A1 * | 10/2003 | Jung | | H04L 27/2621 370/208 |
| 2007/0133462 A1 * | 6/2007 | Guey | | H04B 1/7143 370/330 |
| 2008/0318608 A1 * | 12/2008 | Inoue | | H04B 1/707 455/509 |
| 2011/0156932 A1 * | 6/2011 | Mittal | | H03M 7/3082 341/51 |
| 2011/0268050 A1 * | 11/2011 | Farajidana | | H04L 25/0226 370/329 |
| 2011/0280181 A1 * | 11/2011 | Guey | | H04L 27/2607 370/328 |
| 2012/0224862 A1 * | 9/2012 | Liu | | H04B 10/5161 398/152 |
| 2013/0089339 A1 * | 4/2013 | Liu | | H04B 10/112 398/152 |
| 2014/0053038 A1 * | 2/2014 | Petyushko | | H03M 13/015 714/752 |
| 2014/0192756 A1 * | 7/2014 | Baldemair | | H04L 5/001 370/329 |
| 2016/0049156 A1 * | 2/2016 | Mittal | | H03M 7/3082 704/204 |
| 2016/0049157 A1 * | 2/2016 | Mittal | | H03M 7/3082 704/500 |
| 2016/0049158 A1 * | 2/2016 | Ashley | | H03M 7/3082 704/500 |
| 2016/0049159 A1 * | 2/2016 | Ashley | | H03M 7/4012 704/500 |
| 2017/0263262 A1 * | 9/2017 | Mittal | | H03M 7/3082 |
| 2018/0097677 A1 * | 4/2018 | Guey | | H04L 43/16 |

FOREIGN PATENT DOCUMENTS

| | | | | |
|---|---|---|---|---|
| EP | | 1649304 A1 * | 4/2006 | G01S 7/282 |
| WO | WO-2018064895 A1 * | | 4/2018 | H04L 7/00 |

* cited by examiner

METHOD AND APPARATUS FOR SYNCHRONIZATION

INCORPORATION BY REFERENCE

This present disclosure claims the benefit of U.S. Provisional Application No. 62/403,220, "Synchronization Signal Design based on Pulse Position Modulation" filed on Oct. 3, 2016 and U.S. Provisional Application No. 62/404,807, "Synchronization Signal Design based on Pulse Position Modulation" filed on Oct. 6, 2016, which are incorporated herein by references in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a wireless communication network, an electronic device can transmit one or more reference signals for synchronization and/or device identification. In an example, a base station broadcasts a primary synchronization signal (PSS) and a secondary synchronization signal (SSS). From the primary synchronization signal and the secondary synchronization signal, user equipment can acquire timing information, frequency information, and identification of the base station.

SUMMARY

Aspects of the disclosure provide an apparatus that includes a baseband processing circuit and a transmitting circuit. The baseband processing circuit is configured to encode a reference signal based on a specific sequence to generate a digital stream. The specific sequence has non-zero values at selected positions, and the number of coincidences of non-zero value positions between the specific sequence and a shifted copy of the specific sequence is smaller than a threshold. The transmitting circuit is configured to transmit wireless signals in response to the digital stream.

In an example, the baseband processing circuit is configured to encode one or more reference signals for synchronization and/or device identification based on the specific sequence.

According to an aspect of the disclosure, the baseband processing circuit is configured to encode the reference signal in at least one of a time domain, a frequency domain, or a time-frequency domain based on the specific sequence. The non-zero values can be one of constant, phase modulated, and amplitude modulated.

In an embodiment, the baseband processing circuit is configured to encode the reference signal in a frequency domain based on the specific sequence with the non-zero values being phase modulated to minimize a peak to average power ratio in a time domain. In an example, the baseband processing circuit is configured to encode the reference signal in the frequency domain based on the specific sequence with the non-zero values being phase modulated according to a binary phase-shift keying (BPSK).

In an embodiment, the apparatus includes a sequence providing circuit configured to provide the specific sequence to the baseband processing circuit. In an example, the sequence providing circuit includes a memory configured to store the specific sequence. In another example, the sequence providing circuit includes a sequence generator circuit configured to generate the specific sequence. In another example, the sequence providing circuit includes an interface circuit configured to receive the specific sequence from an external source that is out of the apparatus.

Aspects of the disclosure provide a method for communication. The method includes receiving a specific sequence having non-zero values at selected positions. The number of coincidences of non-zero value positions between the specific sequence and a shifted copy of the specific sequence is smaller than a threshold. The method further includes encoding a reference signal based on the specific sequence to generate a digital stream and transmitting wireless signals in response to the digital stream.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
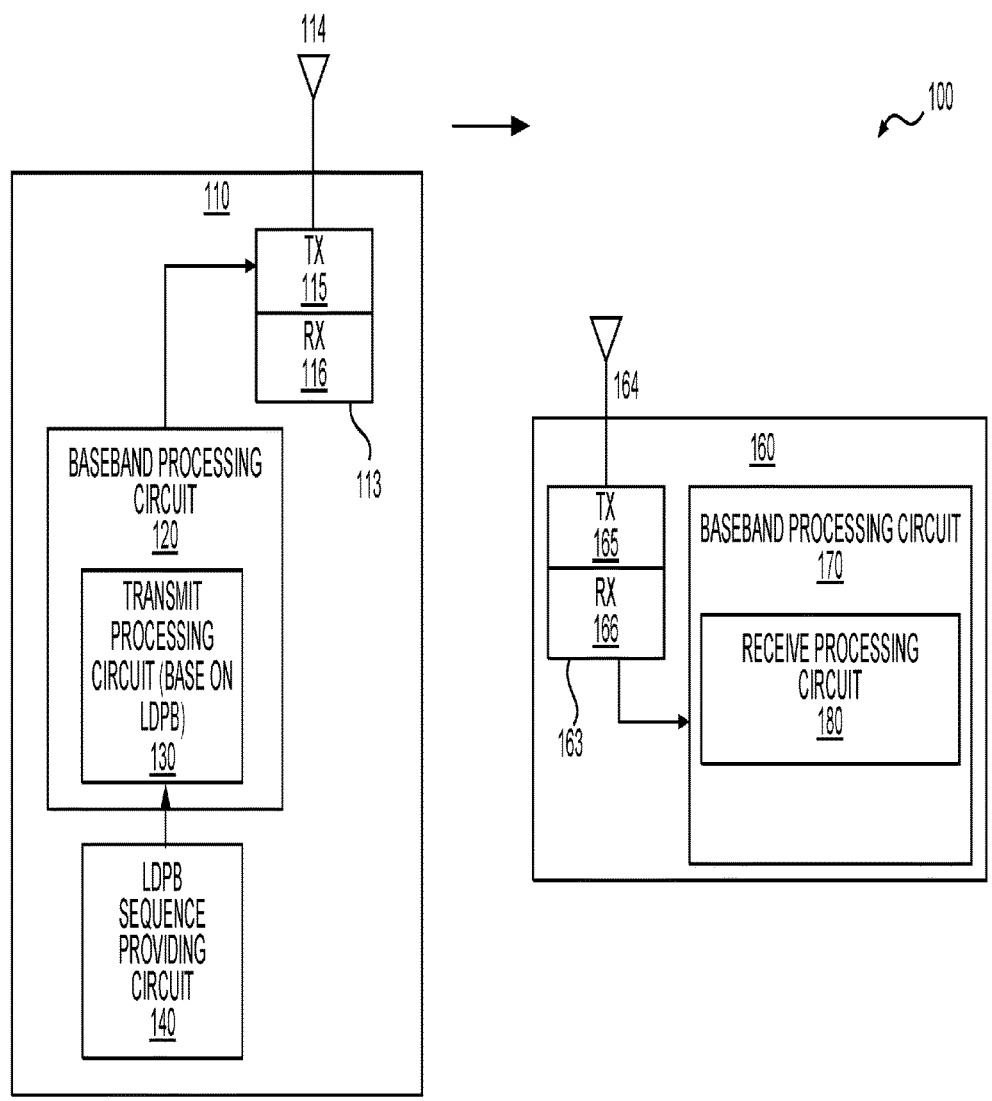
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a plurality of electronic devices, such as a first electronic device 110, a second electronic device 160, and the like, that communicate using wireless signals. At least one of electronic devices in the communication system 100 uses a specific type of sequences that is referred to as low density power boosted (LDPB) sequence for synchronization and/or device identification.

The communication system 100 can be any suitable wireless communication system that uses suitable wireless communication technology, such as second generation (2G) mobile network technology, third generation (3G) mobile network technology, fourth generation (4G) mobile network technology, fifth generation (5G) mobile network technology, global system for mobile communication (GSM), long-term evolution (LTE), a New Radio (NR) access technology, a wireless local area network (WLAN), a Bluetooth technology, a wireless peer-to-peer network technology, and the like.

The plurality of electronic devices can be any suitable devices. In an example, one of the first electronic device 110 and the second electronic device 160 is an interface node in a telecommunication service provider, and the other electronic device is a terminal device. For example, the first electronic device 110 is the interface node, and the second electronic device 160 is the terminal device, or the first electronic device 110 is the terminal device, and the second electronic device 160 is the interface node. In another example, both of the first electronic device 110 and the second electronic device 160 are terminal devices.

In an embodiment, the first electronic device 110 is an interface node, such as a base transceiver station, a Node B, an evolved Node B, and the like, in a telecommunication service provider. The first electronic device 110 includes hardware components and software components configured to enable wireless communications between the first electronic device 110 and terminal devices, such as the second electronic device 160 and the like, that have subscribed services of the telecommunication service provider. The first electronic device 110 is suitably coupled with other suitable nodes, such as core nodes in a backbone of the telecommunication service provider, other interface nodes of the telecommunication service provider, and the like.

Further, in the embodiment, the second electronic device 160 is a terminal device. In an example, the second electronic device 160 is user equipment used by an end-user for mobile telecommunication, such as a cell phone, a smart phone, a tablet computer, a laptop, a wearable device and the like. In another example, the second electronic device 160 is a stationary device, such as a desktop computer. In another example, the second electronic device 160 is a machine type communication device, such as a wireless sensor, an Internet of things (IoT) device and the like.

According to an aspect of the disclosure, an electronic device, such as the first electronic device 110, is configured to generate reference signals for synchronization and/or identification based on one or more LDPB sequences. In an embodiment, a LDPB sequence can originate from a binary sequence that has zero value positions and non-zero value positions. In an example, the LDPB sequence has at least one zero value positions and at least two non-zero value positions. The non-zero value positions are selected to achieve a desired autocorrelation characteristic. For example, the non-zero value positions are selected to minimize the number coincidences of non-zero value positions between a root LDPB sequence and a shifted copy (e.g., cyclically shifted or non-cyclically shifted) of the root LDPB sequence. Generally, the density of non-zero value positions in an LDPB sequence is smaller than a threshold, such as lower than ½, and the power of the LDPB sequence is boosted (e.g., the non-zero values are increased) to match the total power with for example a related sequence. The related sequence has the same length (e.g., the total number of positions) as the LDPB sequence, and has non-zero values at all the positions in an example.

In an example, the non-zero value positions can be selected to achieve an ideal cyclic autocorrelation characteristic. In the example of the ideal cyclic autocorrelation characteristic, any two cyclic shifted sequences from a same root LDPB sequence have at most one coincidence of non-zero value positions when the two cyclic shifts are not the same.

In an embodiment, a LDPB sequence is constructed based on a circular Golomb Ruler (CGR) sequence that has ideal cyclic autocorrelation characteristic.

In an example, a binary sequence of length L (e.g., the total number of positions in the binary sequence) can be denoted by Eq. 1:

$$\bar{c}=\{c_i|c_i\in\{0,1\}, i=0,1,\ldots,L-1\} \quad \text{Eq. 1}$$

In the binary sequence, when a position has binary 0, the position can be referred to as a zero value position, and when a position has binary 1, the position can be referred to as a non-zero value position. The number of non-zero value positions in the binary sequence $\bar{c}$ is represented by P.

A cyclic shift of $\bar{c}$ by $\tau$ positions ($\tau$ is an integer) can be denoted by $\bar{c}(\tau)$. In an example, when the binary sequence $\bar{c}$ satisfies Eq. 2:

$$\langle\bar{c}(\tau_1)\cdot\bar{c}(\tau_2)\rangle = \begin{cases} P & \forall\,\tau_1=\tau_2 \\ 1 & \text{otherwise} \end{cases} \quad \text{Eq. 2}$$

where $\langle\cdot\rangle$ denotes the inner product between the two vectors, the binary sequence $\bar{c}$ has the ideal cyclic autocorrelation characteristic, and the binary sequence $\bar{c}$ is referred to as a circular Golomb Ruler (CGR) with P non-zero positions. The circular Golomb Ruler sequence can be used to construct an LDPB sequence of the ideal cyclic autocorrelation characteristic.

Further, in an embodiment, to construct a circular Golomb Ruler (CGR) with P non-zero positions, the minimum sequence length $L_{min}$ satisfies Eq. 3

$$L_{min}=P\times(P-1)+1 \quad \text{Eq. 3}$$

Further, theoretically when (P−1) is a prime power that can be represented by Eq. 4:

$$P-1=R^N \quad \text{Eq. 4}$$

where R is a prime number (e.g., 2, 3, 5, 7, 11, 13, 17 . . . ), and N is a positive integer (e.g., 1, 2, 3, . . . ), one or more circular Golomb Ruler (CGR) sequences with the minimum sequence length $L_{min}$ exist.

The circular Golomb Ruler sequences can be constructed by various methods. In an embodiment, the circular Golomb Ruler sequences can be generated using exhaustive search. In an example, exhaustive search is performed by an electronic device, such as the first electronic device 110, the second electronic device 160, a processor (not shown) at a core node of a telecommunication service provider, or any other device, to find the circular Golomb Ruler sequences corresponding to different numbers of non-zero positions. The results of the exhaustive search, such as the circular Golomb Ruler sequences corresponding to numbers of non-zero positions, are stored in a memory of an electronic device, such as the first electronic device 110, the second electronic device 160, core nodes in the telecommunication service provider, and the like. The stored circular Golomb Ruler sequences can be used by an electronic device, such as the first electronic device 110 and the like, for synchronization and device identification. Appendix A shows an example of exhaustive search results for 12 non-zero value positions (P=12), and the exhaustive search finds 36 LDPB root sequences for minimum sequence length of 133.

In another embodiment, the circular Golomb Ruler sequences can be constructed on the fly during operation. In an example, the circular Golomb Ruler sequences are constructed based on a construction algorithm, such as disclosed by SINGER, A Theorem in Finite Projective Geometry and Some Applications to Number Theory in Transactions American Mathematical Society, 1938 pp. 377-385.

Generally, the density of the non-zero value positions in the circular Golomb Ruler sequences is relatively low $$\left(\text{e.g., about } \frac{1}{P-1}\right)$$

especially when the number of non-zero value positions P is large. For example, when the number of non-zero value positions P is 3, the minimum sequence length $L_{min}$ of circular Golomb Ruler sequence is 7 according to Eq. 3, and the density of the non-zero value positions is lower than 2, when the number of non-zero value positions P is 4, the minimum sequence length $L_{min}$ of circular Golomb Ruler sequence is 13 according to Eq. 3, and the density of the non-zero value positions is lower than ⅓; when the number of non-zero value positions P is 5, the minimum sequence length $L_{min}$ of circular Golomb Ruler sequence is 21 according to Eq. 3, and the density of the non-zero value positions is lower than ¼; when the number of non-zero value positions P is 10, the minimum sequence length $L_{min}$ of circular Golomb Ruler sequence is 91 according to Eq. 3, and the density of the non-zero value positions is lower than ⅑.

Further, according to an aspect of the disclosure, power at the non-zero value positions of circular Golomb Ruler sequence can be suitably boosted to construct the LDPB sequence, such that the total power for sending signals according to the LDPB sequence is about the same level as sending signals according to the related sequence that has the same length as the LDPB sequence and has non-zero values at all the positions for example.

According to another aspect of the disclosure, the LDPB sequence can be constructed based on a non-cyclic binary sequence, such as a Golomb Ruler sequence in which no two pairs of non-zero value positions are of the same distance apart. In the Golomb Ruler sequence example, the number of non-zero value positions is the order of the Golomb Ruler sequence, and the length of the Golomb Ruler sequence corresponds to the last non-zero value position. For example, a 11-order Golomb Ruler sequence of 73 length has non-zero values at positions 0, 1, 4, 13, 28, 33, 47, 54, 64, 70, 72.

According to an aspect of the disclosure, the communication system 100 is configured to use a group of sequences that are generated from a same root LDPB sequence for synchronization and device identification. In an example, the group of sequences includes the root LDPB sequence, cyclically and/or non-cyclically shifted copies of the root LDPB sequence. In an example, the group of sequences can be respectively assigned to different devices for device identification. In another example, two or more sequences in the group of sequences can be assigned to one device, such as the first electronic device 110, thus the first electronic device 110 can use the two or more sequences to respectively signal different information.

In an embodiment, the communication system 100 can use a group of sequences that are generated from multiple root LDPB sequences for synchronization and device identification. In an example, the multiple root LDPB sequences can be selected to have reduced number of cross coincidences. In an example, a first circular Golomb Ruler sequence of length 133 and a second circular Golomb Ruler sequence of length 133 are selected. The first circular Golomb Ruler sequence includes non-zero value positions at 0, 1, 3, 12, 20, 34, 38, 81, 88, 94, 104 and 109, and the second circular Golomb Ruler sequence includes non-zero value positions at 0, 1, 25, 30, 40, 46, 53, 96, 100, 114, 122, and 131. In an example, the maximum cross correlation (e.g., cross-coincidences) of the first circular Golomb Ruler sequence and the second circular Golomb Ruler sequence is two. In the example, the group of sequences can include the first circular Golomb Ruler sequence, cyclically and/or non-cyclically shifted copies of the first circular Golomb Ruler sequence, the second circular Golomb Ruler sequence and cyclically and/or non-cyclically shifted copies of the second circular Golomb Ruler sequence.

Specifically, in the FIG. 1 example, the first electronic device 110 includes a first transceiver 113, a first baseband processing circuit 120 and an LDPB sequence providing circuit 140 coupled together. In an embodiment, the first baseband processing circuit 120 includes a transmit processing circuit 130 configured to encode a reference signal, such as a primary synchronization signal, a secondary synchronization signal, an identification signal, and the like, based on a LDPB sequence. The first electronic device 110 can include other suitable components (not shown), such as processors, memory, and the like.

The second electronic device 160 includes a second transceiver 163 and a second baseband processing circuit 170 coupled together. The second baseband processing circuit 170 includes a receive processing circuit 180 for detecting the reference signal that is encoded based on the LDPB sequence. The second electronic device 160 can include other suitable components (not shown), such as processors, memory, and the like.

It is noted that the communication system 100 can include other devices that are configured similarly as the first electronic device 110 or the second electronic device 160.

It is noted that the first baseband processing circuit 120 can include other suitable components, such as a receive processing circuit (not shown) and the like. Similarly, the second baseband processing circuit 170 can include other suitable components, such as a transmit processing circuit (not shown) and the like.

The first transceiver 113 is configured to receive and transmit wireless signals. In an example, the first transceiver 113 includes a receiving circuit RX 116 and a transmitting circuit TX 115. The receiving circuit RX 116 is configured to generate electrical signals in response to captured electromagnetic waves by an antenna 114, and process the electrical signals to extract digital samples from the electrical signals. For example, the receiving circuit RX 116 can filter, amplify, down convert, and digitalize the electrical signals to generate the digital samples. The receiving circuit RX 116 can provide the digital samples to the first baseband processing circuit 120 for further processing.

In an example, the transmitting circuit TX 115 is configured to receive digital stream (e.g., output samples) from the first baseband processing circuit 120, process the digital stream to generate radio frequency (RF) signals, and cause the antenna 114 to emit electromagnetic waves in the air to carry the digital stream. In an example, the transmitting circuit TX 115 can convert the digital stream to analog signals, and amplify, filter and up-convert the analog signals to generate the RF signals.

In the FIG. 1 example, the LDPB sequence providing circuit 140 is configured to provide one or more LDPB sequences to the transmit processing circuit 130. In an example, the LDPB sequence providing circuit 140 is implemented as a memory circuit storing LDPB sequences. The LDPB sequences are predetermined by exhaustive search or theoretical construction. In an example, the LDPB sequences are assigned to the first electronic device 110. The LDPB sequences can be stored in any suitable form. In an example, an LDPB sequence is stored in the form of a plurality of non-zero value positions.

In an embodiment, an LDPB sequence is stored with a phase modulation configuration. In an example, the LDPB sequence is used to encode a reference signal in the frequency domain. The phase modulation configuration is pre-determined to minimize peak to average power ratio (PAPR) of the time domain, for example to optimize performance of a power amplifier (not shown) in the first transceiver 113. In an example, binary phase-shift keying (BPSK) is used in the phase modulation. Then, each non-zero value position can select one of two phases for phase modulation. In an example, combinations of the selected phases for the LDPB sequence are tested to determine the phase modulation configuration with the lowest PAPR.

It is noted that the LDPB sequence providing circuit 140 can be implemented using other suitable circuit. In another example, the LDPB sequence providing circuit 140 is implemented as a processor executing software instructions to generate one or more LDPB sequences on the fly. In another example, the LDPB sequence providing circuit 140 is implemented using logic circuit configured to generate one or more LDPB sequences on the fly. In another example, the LDPB sequence providing circuit 140 is implemented using communication interface circuit configured to receive one or more LDPB sequences from an external source that is out of the first electronic device 110, such as a core node of the telecommunication service provider According to an aspect of the disclosure, the transmit processing circuit 130 is configured to receive the one or more LDPB sequences, and encode one or more reference signals that are used for synchronization and/or device identification, such as a primary synchronization signal, a secondary synchronization signal, and the like, based on the one or more LDPB sequences. Further, in an embodiment, the transmit processing circuit 130 can suitably encode other information, such as data and control information, and generate a digital stream (e.g., output samples) in response to the encoded reference signals, data and control information.

It is noted that the one or more LDPB sequences can be mapped and used in various domains, such as time domain, frequency domain, two dimensional time frequency domain, and the like. In an embodiment, the transmit processing circuit 130 can encode the reference signals in a time domain based on the one or more LDPB sequences. In an example, non-zero values are placed at different time marks corresponding to the non-zero value positions in the LDPB sequence.

In another embodiment, the transmit processing circuit 130 can encode the reference signals in a frequency domain based on the one or more LDPB sequences. In an example, non-zero values are placed at certain sub-carriers corresponding to the non-zero value positions in the LDPB sequence.

In another embodiment, the transmit processing circuit 130 can encode the reference signals in two dimensional time frequency domain based on the one or more LDPB sequences. In an orthogonal frequency-division multiplexing (OFDM) system example, a set of resource elements are used to carry a reference signal, and each resource element corresponds to a specific sub-carrier in the frequency dimension and a specific symbol in the time dimension. In the example, the transmit processing circuit 130 can map the LDPB sequence to the set of resource elements. For example, the transmit processing circuit 130 can place non-zero values at resource elements that are mapped to the non-zero value positions in the LDPB sequence. In an embodiment, the non-zero values are complex values for phase modulation and power boosting, and a waveform is modulated according to the complex values and the positions of the resource elements.

It is noted that, in an example, the set of resource elements can be an arbitrary set of resource elements.

According to an aspect of the disclosure, the transmit processing circuit 130 can also process other information, such as control information, data, and the like. For example, the transmit processing circuit 130 can process data according to suitable channel coding technique, such as error detection coding technique, rate matching coding technique, low density parity check (LDPC) coding technique, polar coding technique and the like. In an example, the data can be suitably modulated and multiplexed to generate OFDM symbols. Then, the OFDM symbols are interleaved and mapped to resource elements allocated for data transmission.

The transmit processing circuit 130 then generates the digital stream based on the resource element mapping results of various information processing, such as the reference signals processing, the data processing, the downlink control information processing, and the like.

It is noted that the transmit processing circuit 130 can perform other suitable functions, such as scrambling, and the like. It is noted that the transmit processing circuit 130 can be implemented using various techniques. In an example, the transmit processing circuit 130 is implemented as integrated circuits. In another example, transmit processing circuit 130 is implemented as one or more processors executing software instructions.

According to an aspect of the disclosure, the reference signals can be detected by the second electronic device 160 to provide time synchronization information, frequency synchronization information, device identification, sub-carrier spacing of data channel, location of carrier's center frequency, and the like to the second electronic device 160.

In the second electronic device 160, the second transceiver 163 is configured to receive and transmit wireless signals. In an example, the second transceiver 163 includes a receiving circuit RX 166 and a transmitting circuit TX 165. The receiving circuit RX 166 is configured to generate electrical signals in response to captured electromagnetic waves by an antenna 164, and process the electrical signals to extract digital samples from the electrical signals. For example, the receiving circuit RX 166 can filter, amplify, down convert, and digitalize the electrical signals to generate the digital samples. The receiving circuit RX 166 can provide the digital samples to the second baseband processing circuit 170 for further processing.

In an example, the transmitting circuit TX 165 is configured to receive a digital stream (e.g., output samples) from the second baseband processing circuit 170, process the digital stream to generate radio frequency (RF) signals, and cause the antenna 164 to emit electromagnetic waves in the air to carry the digital stream. In an example, the transmitting circuit TX 165 can convert the digital stream to analog signals, and amplify, filter and up-convert the analog signals to generate the RF signals.

According to an aspect of the disclosure, the receive processing circuit 180 is configured to receive the digital samples from the receiving circuit RX 166. Based on the digital samples, the receive processing circuit 180 detects one or more reference signals that are encoded based on the LDPB sequences, and establishes timing and/or frequency synchronization with the first electronic device 110 based on the LDPB sequences.

It is also noted that while single antenna per device is used in the FIG. 1 example, the communication system 100 can be suitably modified to use multiple input, multiple output (MIMO) antenna technology.

Figure 2:
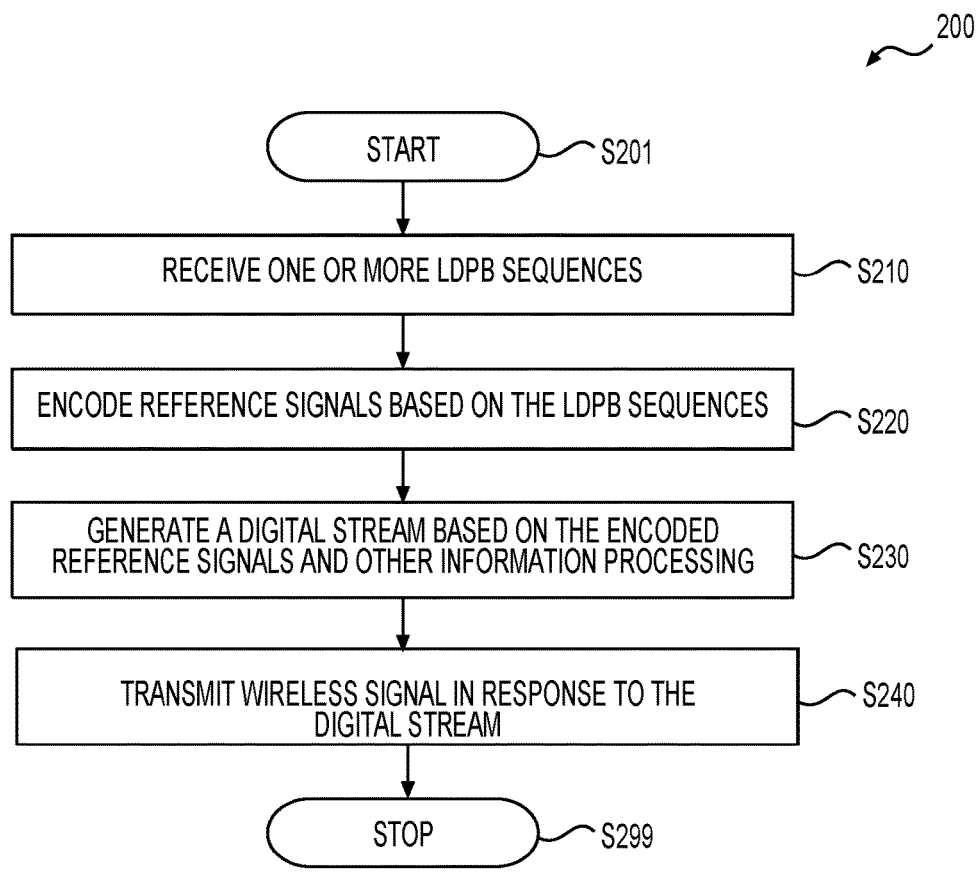
FIG. 2 shows a flow chart outlining a process 300 according to an embodiment of the disclosure.

FIG. 2 shows a flow chart outlining a process 200 according to an embodiment of the disclosure. In an example, the process 200 is executed by the first electronic device 110 to transmit wireless signals with one or more reference signals encoded based on LDPB sequences. The process starts at S201 and proceeds to S210.

At S210, one or more LDPB sequences are received. In the FIG. 1 example, the first baseband processing circuit 130 receives one or more LDPB sequences from the sequence providing circuit 140.

At S220, reference signals are encoded based on the LDPB sequences. In the FIG. 1 example, the transmit processing circuit 130 can encode the reference signals in two dimensional time frequency domain based on the one or more LDPB sequences. In an orthogonal frequency-division multiplexing (OFDM) system example, a set of resource elements are used to carry a reference signal, and each resource element corresponds to a specific sub-carrier in the frequency dimension and a specific symbol in the time dimension. In the example, the transmit processing circuit 130 can map the LDPB sequence to the set of resource elements. For example, the transmit processing circuit 130 can place non-zero values at resource elements that are mapped to the non-zero value positions in the LDPB sequence. In an embodiment, the non-zero values are complex values for phase modulation and power boosting. Further, a waveform is modulated according to the complex values and the positions of the resource elements.

At S230, a digital stream is generated based on various information processing. In the FIG. 1 example, the transmit processing circuit 130 then generates the digital stream based on the resource element mapping results of various information processing, such as the reference signals processing, the data processing, the downlink control information processing, and the like.

At S240, wireless signals are transmitted in response to the digital stream. In the FIG. 1 example, the transmitting circuit TX 115 receives the digital stream from the first baseband processing circuit 120, processes the digital stream to generate radio frequency (RF) signals, and causes the antenna 114 to emit electromagnetic waves in the air to carry the digital stream. The process then proceeds to S299 and terminates.

Figure 3:
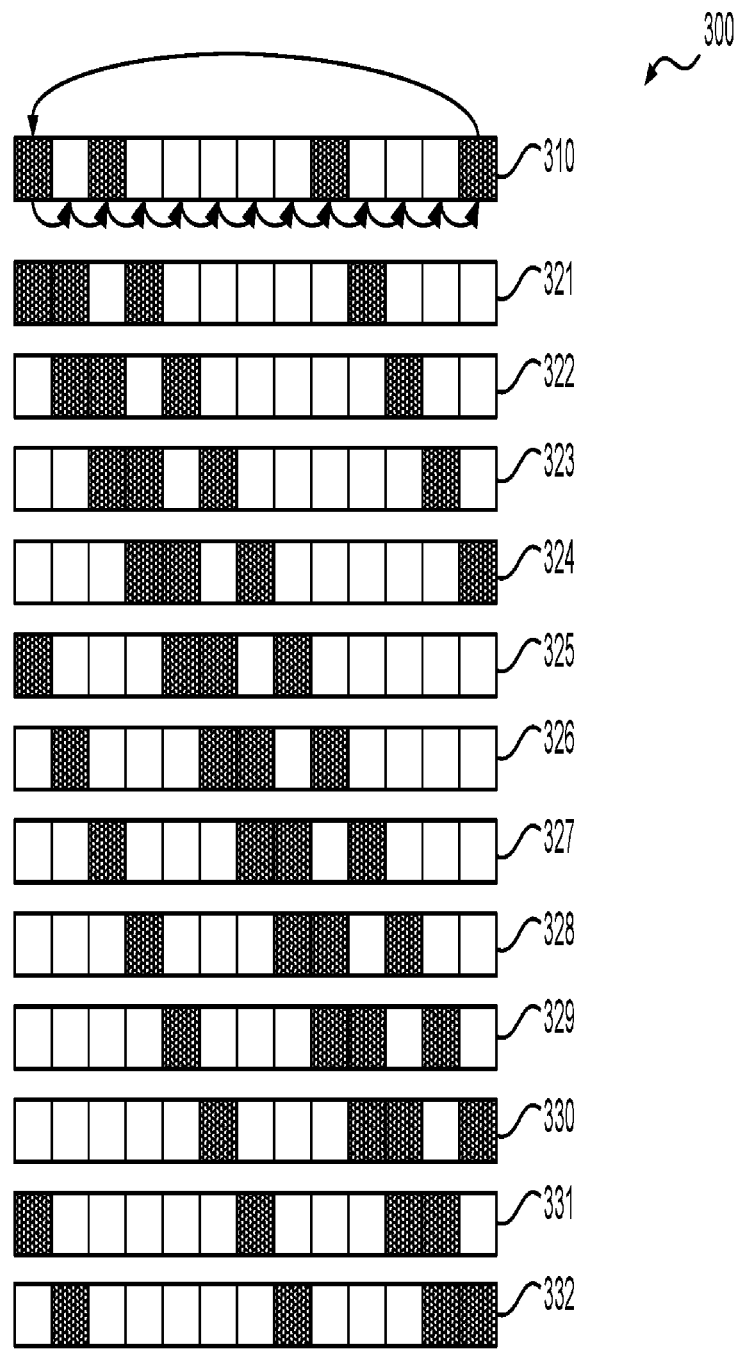
FIG. 3 shows a diagram of a low density power boosted sequence example according to an embodiment of the disclosure.

FIG. 3 shows a diagram 300 of an LDPB sequence example according to an embodiment of the disclosure. The diagram 300 uses a solid square to represent a non-zero value position, and uses a blank square to represent a zero value position. The LDPB sequence is a circular Golomb Ruler (CGR) with 4 non-zero value positions, the length of the LDPB sequence is 13, and the density of the non-zero values is lower than ⅓.

The diagram 300 includes a root sequence 310, and a plurality of cyclic shifted copies 321-332. The LDPB sequence in the FIG. 3 example has an ideal cyclic autocorrelation characteristic. For example, any two of the 310, and 321-332 have at most one coincidence of non-zero value positions.

Figure 4:
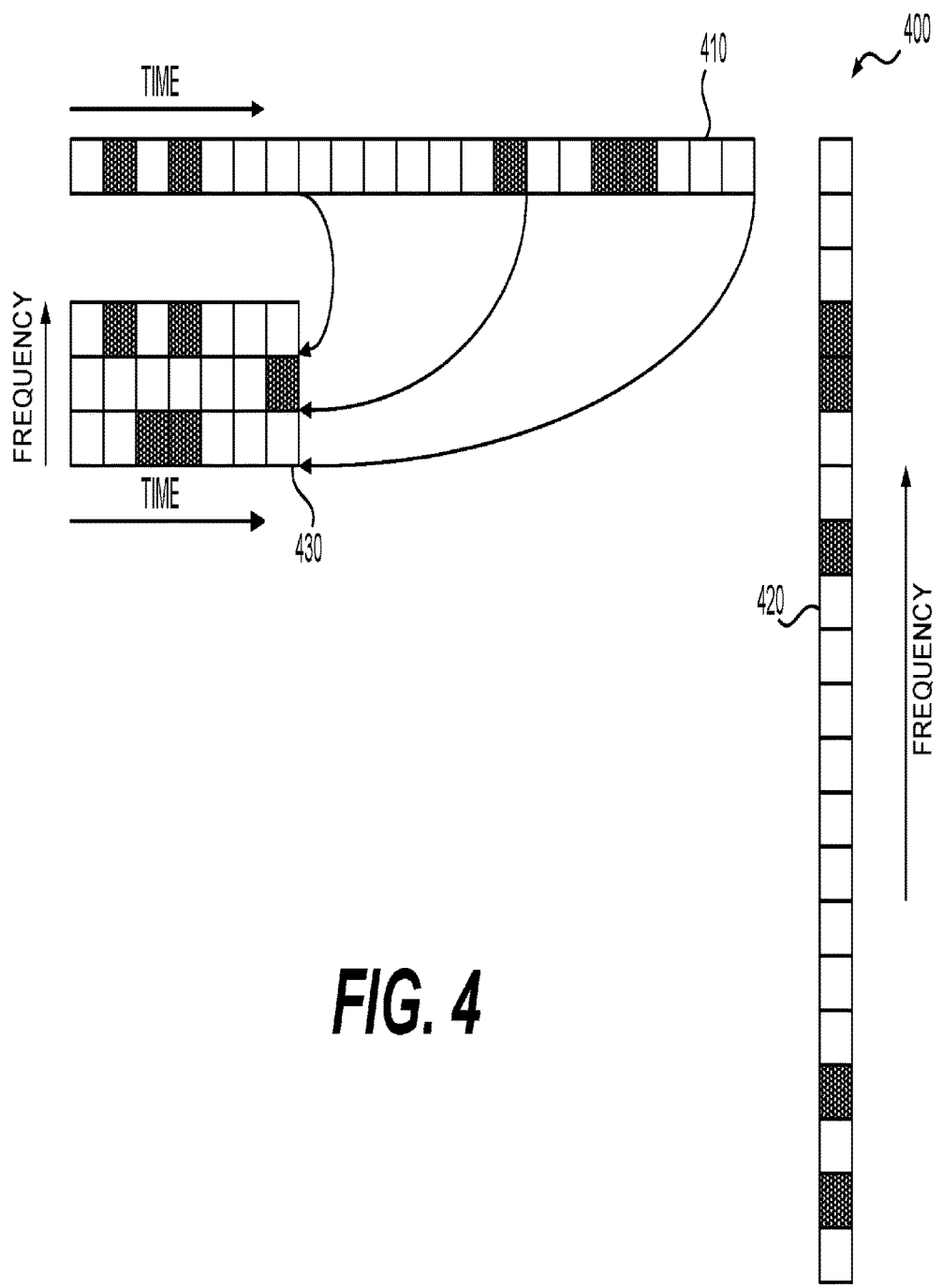
FIG. 4 shows a diagram of using a low density power boosted sequence in different domains according to embodiments of the disclosure.

FIG. 4 shows a diagram 400 of using a LDPB sequence in different domains according to embodiments of the disclosure. The diagram 400 uses a solid square to represent a non-zero value position, and uses a blank square to represent a zero value position. The LDPB sequence is a circular Golomb Ruler (CGR) with 5 non-zero value positions, the length of the LDPB sequence is 21, and the density of the non-zero values is lower than ¼.

The diagram 400 includes a first mapping 410 of the LDPB in the time domain. Each position in the LDPB sequence can be mapped to a time mark in the time scale according to the first mapping 410.

The diagram 400 includes a second mapping 420 of the LDPB in the frequency domain. Each position in the LDPB sequence can be mapped to a sub-carrier in the frequency domain according to the second mapping 420.

The diagram 400 includes a third mapping 430 of the LDPB in the two dimensional time frequency domain. Each position in the LDPB sequence is mapped to a resource element in the two dimensional time frequency domain according to the third mapping 430.

Appendix A: EXHAUSTIVE SEARCH RESULTS FOR $P=12$, $L_{MIN}=133$

| | | | | | | | | | | | |
|---|---|---|---|---|---|---|---|---|---|---|---|
| 1. | 0 | 1 | 3 | 12 | 20 | 34 | 38 | 81 | 88 | 94 | 104 | 109 |
| 2. | 0 | 1 | 3 | 15 | 46 | 71 | 75 | 84 | 94 | 101 | 112 | 128 |
| 3. | 0 | 1 | 3 | 17 | 21 | 58 | 65 | 73 | 100 | 105 | 111 | 124 |
| 4. | 0 | 1 | 3 | 17 | 29 | 61 | 80 | 86 | 91 | 95 | 113 | 126 |
| 5. | 0 | 1 | 4 | 12 | 21 | 26 | 45 | 68 | 84 | 97 | 99 | 127 |
| 6. | 0 | 1 | 4 | 16 | 50 | 71 | 73 | 81 | 90 | 95 | 101 | 108 |
| 7. | 0 | 1 | 4 | 27 | 51 | 57 | 79 | 89 | 100 | 118 | 120 | 125 |
| 8. | 0 | 1 | 5 | 12 | 15 | 31 | 33 | 39 | 56 | 76 | 85 | 98 |
| 9. | 0 | 1 | 5 | 21 | 24 | 39 | 49 | 61 | 75 | 92 | 125 | 127 |
| 10. | 0 | 1 | 5 | 24 | 44 | 71 | 74 | 80 | 105 | 112 | 120 | 122 |
| 11. | 0 | 1 | 5 | 25 | 28 | 68 | 78 | 87 | 89 | 104 | 120 | 126 |
| 12. | 0 | 1 | 6 | 18 | 39 | 68 | 79 | 82 | 98 | 102 | 124 | 126 |
| 13. | 0 | 1 | 6 | 22 | 33 | 40 | 50 | 59 | 63 | 88 | 119 | 131 |
| 14. | 0 | 1 | 7 | 9 | 42 | 59 | 73 | 85 | 95 | 110 | 113 | 129 |
| 15. | 0 | 1 | 7 | 35 | 37 | 50 | 66 | 89 | 108 | 113 | 122 | 130 |
| 16. | 0 | 1 | 8 | 10 | 32 | 36 | 52 | 55 | 66 | 95 | 116 | 128 |
| 17. | 0 | 1 | 8 | 14 | 30 | 45 | 47 | 56 | 66 | 106 | 109 | 129 |
| 18. | 0 | 1 | 8 | 21 | 33 | 36 | 47 | 52 | 70 | 74 | 76 | 124 |
| 19. | 0 | 1 | 8 | 21 | 39 | 43 | 48 | 54 | 73 | 105 | 117 | 131 |
| 20. | 0 | 1 | 9 | 14 | 16 | 34 | 45 | 55 | 77 | 83 | 107 | 130 |
| 21. | 0 | 1 | 9 | 19 | 24 | 31 | 52 | 56 | 58 | 69 | 72 | 98 |
| 22. | 0 | 1 | 10 | 23 | 29 | 34 | 61 | 69 | 76 | 113 | 117 | 131 |
| 23. | 0 | 1 | 10 | 58 | 60 | 64 | 82 | 87 | 98 | 101 | 113 | 126 |
| 24. | 0 | 1 | 12 | 14 | 22 | 29 | 54 | 60 | 63 | 90 | 110 | 129 |
| 25. | 0 | 1 | 15 | 18 | 20 | 24 | 31 | 52 | 60 | 85 | 95 | 107 |
| 26. | 0 | 1 | 15 | 25 | 45 | 52 | 58 | 61 | 63 | 80 | 84 | 92 |
| 27. | 0 | 1 | 16 | 21 | 24 | 49 | 51 | 58 | 62 | 68 | 80 | 94 |
| 28. | 0 | 1 | 23 | 37 | 57 | 62 | 75 | 83 | 86 | 90 | 92 | 102 |
| 29. | 0 | 1 | 25 | 30 | 40 | 46 | 53 | 96 | 100 | 114 | 122 | 131 |
| 30. | 0 | 1 | 26 | 33 | 39 | 44 | 53 | 61 | 63 | 84 | 118 | 130 |
| 31. | 0 | 1 | 27 | 39 | 49 | 74 | 82 | 103 | 110 | 114 | 116 | 119 |
| 32. | 0 | 1 | 32 | 42 | 44 | 48 | 51 | 59 | 72 | 77 | 97 | 111 |
| 33. | 0 | 1 | 36 | 49 | 58 | 78 | 95 | 101 | 103 | 119 | 122 | 129 |
| 34. | 0 | 1 | 36 | 62 | 65 | 76 | 78 | 82 | 103 | 110 | 115 | 125 |
| 35. | 0 | 1 | 40 | 54 | 66 | 72 | 76 | 83 | 85 | 110 | 113 | 118 |
| 36. | 0 | 1 | 42 | 50 | 54 | 71 | 73 | 76 | 82 | 89 | 109 | 119 |

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
a baseband processing circuit configured to
encode a reference signal based on a specific one-dimensional sequence to generate a digital stream,
wherein the specific sequence has non-zero values at P selected positions, a number of coincidences of non-zero value positions between the specific sequence and each shifted copy of the specific sequence is at most a preset number, and
a total length L of the specific sequence is equal to or greater than $P \times (P-1)+1$, wherein $(P-1)=R^N$, R is a prime number, and N, P and L are positive integers; and
a transmitting circuit configured to transmit, via wireless signals, the digital stream that is generated based on the encoded reference signal.

2. The apparatus of claim 1, wherein the baseband processing circuit is configured to encode one or more reference signals for synchronization and/or device identification based on the specific sequence.

3. The apparatus of claim 1, wherein the baseband processing circuit is configured to encode the reference signal in at least one of a time domain, a frequency domain, or a time-frequency domain based on the specific sequence.

4. The apparatus of claim 1, wherein the baseband processing circuit is configured to encode the reference signal based on the specific sequence with the non-zero values being one of constant, phase modulated, and amplitude modulated.

5. The apparatus of claim 1, wherein the baseband processing circuit is configured to encode the reference signal in a frequency domain based on the specific sequence with the non-zero values being phase modulated to minimize a peak to average power ratio in a time domain.

6. The apparatus of claim 5, wherein the baseband processing circuit is configured to encode the reference signal in the frequency domain based on the specific sequence with the non-zero values being phase modulated according to a binary phase-shift keying (BPSK).

7. The apparatus of claim 1, further comprising:
a sequence providing circuit configured to provide the specific sequence to the baseband processing circuit.

8. The apparatus of claim 7, wherein:
the sequence providing circuit comprises a memory configured to store the specific sequence.

9. The apparatus of claim 7, wherein:
the sequence providing circuit comprises a sequence generator circuit configured to generate the specific sequence.

10. The apparatus of claim 7, wherein
the sequence providing circuit comprises an interface circuit configured to receive the specific sequence from an external source that is out of the apparatus.

11. The apparatus of claim 1, wherein the preset number is one.

12. The apparatus of claim 1, wherein the number of coincidences of non-zero value positions is one.

13. A method for communication, comprising:
receiving a specific one-dimensional sequence having non-zero values at selected positions,
a number of coincidences of non-zero value positions between the specific sequence and
each shifted copy of the specific sequence being at most a preset number, and
a total length L of the specific sequence being equal to or greater than $P \times (P-1)+1$, wherein $(P-1)=R^N$, R is a prime number, and N, P, and L are positive;
encoding a reference signal based on the specific sequence to generate a digital stream; and
transmitting, via wireless signals, the digital stream that is generated based on the encoded reference signal.

14. The method of claim 13, wherein encoding the reference signal based on the specific sequence to generate the digital stream further comprises:
encoding one or more reference signals for synchronization and/or device identification based on the specific sequence.

15. The method of claim 13, wherein encoding the reference signal based on the specific sequence to generate the digital stream further comprises:
encoding the reference signal in at least one of a time domain, a frequency domain, or a time-frequency domain based on the specific sequence.

16. The method of claim 13, wherein encoding the reference signal based on the specific sequence to generate the digital stream further comprises:
encoding the reference signal based on the specific sequence with the non-zero values being one of constant, phase modulated, and amplitude modulated.

17. The method of claim 13, wherein encoding the reference signal based on the specific sequence to generate the digital stream further comprises:
encoding the reference signal in a frequency domain based on the specific sequence with the non-zero values being phase modulated to minimize a peak to average power ratio in a time domain.

18. The method of claim 17, wherein the non-zero values are phase modulated according to a binary phase-shift keying (BPSK).

19. The method of claim 13, wherein receiving the specific sequence having the non-zero values at the selected positions comprises:
storing the specific sequence in a memory; and
accessing the memory to receive the specific sequence.

20. The method of claim 13, wherein receiving the specific sequence having the non-zero values at the selected positions comprises:
generating the specific sequence by a sequence generator circuit; and
receiving the specific sequence from the sequence generator circuit.

21. The method of claim 20, wherein generating the specific sequence by the sequence generator circuit further comprises at least one of:
searching the specific sequence in a search space; and
constructing the specific sequence theoretically.

22. The method of claim 13, wherein receiving the specific sequence having the non-zero values at the selected positions comprises:
receiving the specific sequence from an external source.

23. The method of claim 13, wherein the preset number is one.

24. The method of claim 13, wherein the number of coincidences of non-zero value positions is one.

* * * * *